US007606199B2

(12) United States Patent
Ayyagari et al.

(10) Patent No.: US 7,606,199 B2
(45) Date of Patent: Oct. 20, 2009

(54) CENTRAL COORDINATOR SELECTION, HANDOVER, BACKUP AND FAILURE RECOVERY

(75) Inventors: Deepak Ayyagari, Vancouver, WA (US); Wai Chung Chan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 575 days.

(21) Appl. No.: 11/353,898

(22) Filed: Feb. 13, 2006

(65) Prior Publication Data

US 2007/0013419 A1 Jan. 18, 2007

Related U.S. Application Data

(60) Provisional application No. 60/699,836, filed on Jul. 14, 2005.

(51) Int. Cl.
*H04W 4/00* (2009.01)
(52) U.S. Cl. .......................... 370/331; 370/338; 455/436
(58) Field of Classification Search .................. 370/395, 370/331, 455, 447, 449, 450, 461, 458, 445, 370/338; 455/436
See application file for complete search history.

(56) References Cited

U.S. PATENT DOCUMENTS

| 5,325,358 | A * | 6/1994 | Goeldner ..................... 370/219 |
| 6,690,678 | B1 * | 2/2004 | Basso et al. .................. 370/468 |
| 6,751,196 | B1 * | 6/2004 | Hulyalkar et al. ........... 370/252 |
| 6,804,209 | B1 * | 10/2004 | Sugaya et al. ................ 370/328 |
| 6,973,023 | B1 * | 12/2005 | Saleh et al. .................. 370/217 |
| 7,061,906 | B2 * | 6/2006 | Bruno et al. ................. 370/352 |
| 7,289,489 | B1 * | 10/2007 | Kung et al. .................. 370/352 |
| 7,304,968 | B2 * | 12/2007 | Dawidowsky et al. ....... 370/331 |
| 7,486,953 | B2 * | 2/2009 | Robinson ..................... 455/442 |
| 7,499,429 | B2 * | 3/2009 | Dawidowsky et al. ....... 370/331 |
| 2002/0001307 | A1 * | 1/2002 | Nguyen et al. .............. 370/386 |
| 2003/0043765 | A1 * | 3/2003 | Dawidowsky et al. ....... 370/331 |
| 2003/0058819 | A1 * | 3/2003 | Dawidowsky et al. ....... 370/331 |
| 2004/0196872 | A1 * | 10/2004 | Nakamura ................... 370/512 |
| 2005/0147107 | A1 * | 7/2005 | Powers et al. ............... 370/397 |
| 2007/0268913 | A1 * | 11/2007 | Denecheau et al. ......... 370/397 |

FOREIGN PATENT DOCUMENTS

JP 2003-098543 * 4/2003

OTHER PUBLICATIONS

Machine Translation of Japanese Patent Application JP2003-098543 to Nagaike-Cho et al., Apr. 2003.*

* cited by examiner

*Primary Examiner*—Ayaz R Sheikh
*Assistant Examiner*—Faiyazkhan Ghafoerkhan
(74) *Attorney, Agent, or Firm*—Michael Blaine Brooks; Michael B. Brooks; David Ripma

(57) ABSTRACT

The embodiments of the present invention provide methods, systems, and devices for improving network management in a centralized network, which typically includes a central coordinator (CCO) that manages and schedules activities within the network. The embodiments of the invention provide a manner of selecting a CCO, including a backup CCO, best suited to manage the network based on a set of rules. Furthermore, the embodiments provide a manner of transferring the current CCO functions to a new CCO, e.g., via message exchanges. Moreover, a process of a backup CCO assuming the function of an unavailable CCO is also described.

19 Claims, 10 Drawing Sheets

CENTRAL COORDINATOR SELECTION, HANDOVER, BACKUP AND FAILURE RECOVERY

CROSS-REFERENCE TO RELATED APPLICATIONS

This application claims the benefit of U.S. Provisional Patent Applications Ser. No. 60/699,836 filed Jul. 14, 2005, entitled "Central Coordinator Selection, Handover, Backup and Failure Recovery," which is hereby incorporated by reference herein for all purposes.

BACKGROUND

The present invention is related to networks and, particularly, to managing centralized networks. Centralized networks typically have a device managing the activities of the network. Failure of devices within a network, however, is highly foreseeable; and, thus a way to handle failures or interruptions of such managing devices to enable the seamless operation of the network is highly desirable. Furthermore, a way to optimize or otherwise improve the operation of a network, such as being able to determine which station in the network is better or best equipped to handle network management is thus also desirable.

SUMMARY

In some embodiments of the invention, a method is provided for improving network management in a centralized network that includes a first central coordinator (CCO) and a station adapted to perform CCO functions. The method includes the steps of indicating to the centralized network that a CCO handover is in progress; transmitting, by the first CCO to the station, a list of stations associated with the centralized network; receiving, by the first CCO from the station, a message in response to the transmitted list of stations; initiating a handover countdown timer; and if the handover countdown timer expires, performing, by the station, CCO functions. The CCO functions include transmitting beacons within the centralized network and the beacons include network scheduling and allocation information.

In other embodiments of the invention, a method of improving network management in a centralized network is also provided. The centralized network includes a first CCO, a first backup CCO, and at least one station. The method includes the steps of detecting, by the first backup CCO, first CCO beacons from the first CCO; and if the first CCO beacons are not detected within a defined period, transmitting, by the first backup CCO, first backup beacons comprising network scheduling and allocation information; requesting topology information from the at least one station in the centralized network, wherein the topology information comprises information related to stations discovered by the at least one station and information related to centralized networks discovered by the at least one station; and selecting a second backup CCO to replace the first backup CCO, wherein the second backup CCO is adapted to perform CCO operations when currently operating beacons from a currently operating CCO are no longer detected by the second backup CCO.

In other embodiments of the invention, a method of selecting a new CCO within a centralized network is also provided. Typically the centralized network includes a current CCO and at least one station. The method includes the steps of determining one or more stations from the at least one station that are ranked higher than the current CCO based on a topology table associated with the current CCO and a set of rules of precedence; and selecting a new CCO with a highest ranking from the determined one or more stations. This selecting step is based on at least one of the following: if there is only one station from the determined one or more stations with the highest ranking, selecting the only one station to be the new CCO; and if there are two or more stations from the determined one or more stations with the highest ranking, selecting one of the two or more stations with the highest ranking to be the new CCO. The topology table includes a list of discovered stations and a list of discovered centralized networks.

In other embodiments of the invention, a device adapted to be coupled to a centralized network is provided. This device includes a central coordinator (CCO) auto-selection module, and a rules of precedence module. The CCO auto-selection module is adapted to determine one or more stations associated with the centralized network, wherein the one or more stations are ranked higher than a current CCO; and to select a new CCO with a highest ranking from the determined one or more stations. The selecting step is typically based on at least one of the following: if there is only one station from the determined one or more stations with the highest ranking, selecting the only one station to be the new CCO; and if there are two or more stations from the determined one or more stations with the highest ranking, selecting one of the two or more stations with the highest ranking to be the new CCO. The rules of precedence module is adapted to rank one or more stations associated with the centralized network, based on a topology table associated with the centralized network and a set of rules of precedence. The topology table includes a list of discovered stations. Furthermore, the set of rules of precedence is based on at least one of the following criteria: whether a station is user-appointed; the CCO-capability classification of a station; a count of discovered stations associated with a station; and a count of discovered networks associated with a station.

In other embodiments of the invention, a system is provided that includes a CCO, a backup CCO, and at least one network segment operably connecting the CCO and the backup CCO. The CCO is adapted to transmit first beacons; to auto-select a new CCO from at least one station based on ranking information associated with each of the at least one station, wherein the ranking information is determined based on a CCO topology table and a set of rules of precedence; and to accept station identification of a station to function as a new central coordinator. Each of the first beacons typically includes network scheduling and allocation information. The backup CCO is adapted to detect the first beacons transmitted by the CCO; and if the first beacons transmitted by the CCO are not detected within a defined period, transmit second beacons, each second beacon comprising network scheduling and allocation information, wherein at least one of the second beacons is transmitted using a beacon slot previously allocated to the CCO; to request topology information, wherein the topology information comprises a list of discovered stations and a list of discovered networks; to request link information; and to select a new backup CCO.

In other embodiments of the invention, a device adapted to be coupled to a centralized network is provided. This device includes an input and output interface adapted to receive and transmit messages within the centralized network; and a backup and failure recovery module. The backup and failure recovery module is adapted to detect first beacons from a CCO; and if the first beacons are not detected within a defined period, transmit second beacons, each second beacon comprising network scheduling and allocation information, wherein at least one of the second beacons is transmitted using a beacon slot previously allocated to the CCO; to request topology information from at least one station associated with the centralized network, wherein the topology information comprises information related to a set of stations discovered by the at least one station and information related to centralized networks discovered by the at least one station; to request link information associated with one or more links active within the centralized network; and to select a backup CCO, wherein the backup CCO is adapted to perform CCO operations when currently operating beacons from a currently operating CCO are no longer detected by the second backup CCO.

BRIEF DESCRIPTION OF THE DRAWINGS

The present invention is illustrated by way of example and not limitation in the figures of the accompanying drawings, and in which.

DETAILED DESCRIPTION OF THE INVENTION

Figure 1:
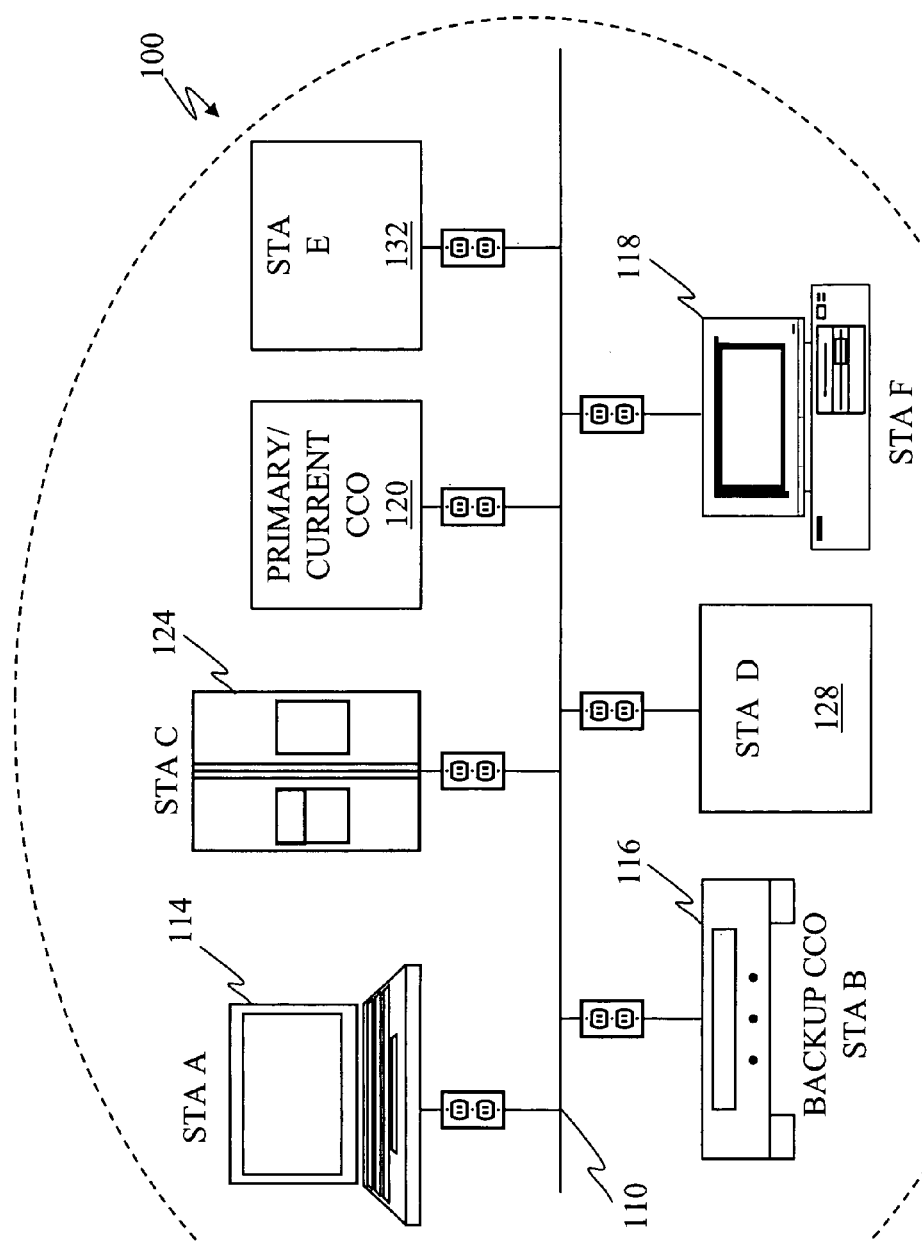
FIG. 1 is a high-level block diagram of an exemplary data communication network system, according to an embodiment of the invention.
Figure 2:
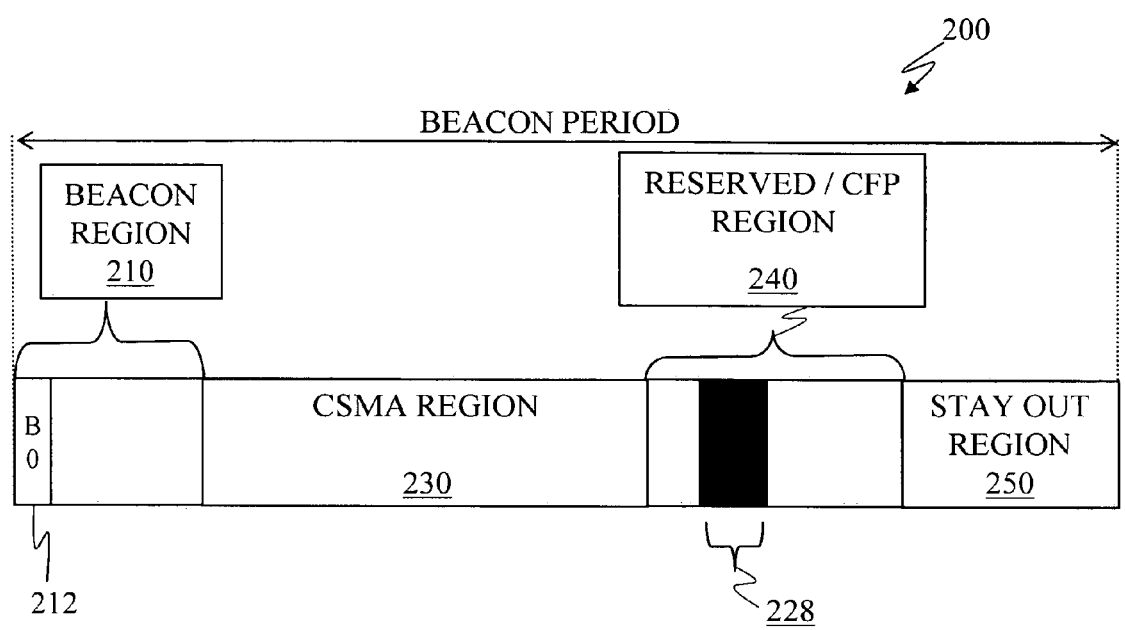
FIG. 2 is an exemplary beacon structure according to an embodiment of the invention.

To better understand the figures, reference numerals within the one hundred series, for example, 100 and 120, are initially introduced in FIG. 1, reference numerals in the two hundred series, for example, 200 and 228, are initially introduced in FIG. 2, and so on and so forth. So, reference numerals in the eight hundred series, e.g. 816 and 820, are initially introduced in FIG. 8.

FIG. 1 is a high-level block diagram of an exemplary data communication network system 100 according to several embodiments of the invention. In some embodiments, the data communication network 100 has portions or its entire data communication network segments 110 over power lines. Power line communication (PLC), sometimes also called broadband over power line, is a wire-based technology—which may in particular uses medium and low voltage power lines for data communications. These power line networks include networks created by using electrical wirings, for example, in homes and buildings. Data communicated for example, include, but are not limited to, music, streaming videos, files, voice, databases, text files, control commands, and network keys.

In some embodiments of the invention, the network may use time division multiplexing (TDM) as a method of multiple data streams sharing a medium or channel according to time segments. The data streams may be reconstructed according to their time slots. In general, TDM enables several users/stations to share the same frequency by dividing it into different time slots. The stations transmit in rapid succession, one after the other, each using their own defined time slot. TDMA and TDM are techniques known to those of ordinary skill in the art and may be used with PLC technology. The networks of the present invention may also use other time-division multiplexing technology and methods, and other technology and methods of multiplexing such as orthogonal frequency-division or combinations and variations thereof. Other technologies supporting PLC, e.g., orthogonal frequency-division multiplexing (OFDM), may also be used within the network.

A "centralized network" (CN) refers herein to a network 100 having a central network coordinator also called the central coordinator (CCO) that controls network activities, such as network timing and resources, network scheduling, bandwidth (BW) allocation to all devices within the network, and security, e.g., authentication and key management. In some embodiments, a CCO controls network scheduling and resource allocation using beacons. For each centralized network, there is typically one instance of a CCO and one or more stations/devices. In some embodiments, for example, during the initial set-up of the centralized network 100, the CCO is the only device in the centralized network. Any station or device generally may function as the CCO provided it has the sufficient management functionality. Stations that may be connected to this PLC network 100 include devices such as monitors, TVs, VCRs, DVD players/recorders, other audiovisual devices, computers, game consoles, sound systems, information appliances, smart-home technology appliances, home audio equipment, or any other device that is PLC-enabled or compatible, or is able to communicate via the power lines.

Although the embodiments of the invention herein are exemplified and discussed using power line networks, features of the present invention are also relevant to other networks; by way of example and not limitation, such exemplary networks include: networks that have a centralized architecture with a central coordinator controlling the activities of the devices in the network; networks that use a time-scheduling technology, such as TDMA or other time-division technology, or combinations thereof; and wireless networks.

Accordingly, the use of power line networks in exemplary configurations is intended to aid in understanding the features of the several embodiments of the present invention.

The exemplary data communication network 100 is a centralized network (CN), with a CCO 120 that, in this example, currently performs the network coordination and management functions of the network. This exemplary CN 100 also includes several devices that are stations 114, 124, 132, 116, 128, 118. In this exemplary embodiment, all the stations within the CN are adapted to also function as a CCO, if so appointed. The devices or stations 114, 124, 132, 116, 128, 118, 120 within this CN are operably coupled and connected to each other over power line network segments 110. STA B 116, in this example, has been appointed as the backup CCO. A backup CCO 116 typically functions as a backup device that takes over the functions of the CCO, when the CCO fails or when certain conditions exist in the network 100.

In some embodiments, another CN (not shown) may coordinate with the CN 100, particularly with its CCO 120. In these exemplary embodiments, there may be two or more CNs that coordinate with each other. In some embodiments, not all the stations within the CN 100 are adapted to function as a CCO. In these embodiments, the features of the present invention are modified to handle non-CCO capable stations, such as, not enabling a user to select a non-CCO capable station to function as the CCO or backup CCO of the CN.

Beacons:

In some embodiments, the CCO manages the activities of stations or devices within its network using, for example, beacons. Beacons are typically control messages that identify the frame configuration and the bandwidth (BW) assignments within a time frame to multiple networks and to devices within a given network. Beacons are typically broadcasted by each CCO, e.g., as a multi-network broadcast, and may be decoded by one or more of the devices or stations within the network. Beacons are also typically tagged or identified, such that stations within a network decode and follow the BW allocation of its own network beacon and not the beacon of another network. The length of time between two adjacent beacons is called a beacon period. Beacons are also transmitted typically periodically by the CCO, and typically in unencrypted form. In an alternative embodiment, beacons or portions thereof are encrypted. Stations in the CN 100 typically apply information contained in the beacon to determine the start time of each beacon period and thereby apply the schedules in the beacon to determine the medium access policy for different time intervals within each beacon period.

FIG. 2 shows an exemplary beacon structure and schedule of a beacon 200, or portions thereof, according to some embodiments of the invention. This exemplary beacon 200, for example, allocates bandwidth (BW) allocation to the devices in the network. A CCO is typically also able to communicate outside of its network, for example, communicate with a neighbor CCO/network. In some embodiments, a beacon includes several parts or regions 210, 230, 240, 250, with each region further typically defined into one or more time slots (e.g., slots 212 and 228). In some embodiments, a beacon includes four regions:

Beacon Region:

In some embodiments, a beacon region 210 is the region wherein a CCO is able or permitted to transmit its own beacon, particularly a beacon informing the CN of network scheduling activities and/or BW allocation. The beacon region generally includes a plurality of a certain number of beacon slots or time slots, with the duration of each beacon slot typically sufficient for the transmission of a beacon. In some embodiments, the duration of each beacon slot is equal to the sum of the duration of a beacon PHY protocol data unit (PPDU) and the interframe space.

A beacon region 210 may include a number from one to a maximum number—typically a number that may be defined within the system as representing the number of time slots or beacon slots. In some embodiments, the size of the beacon region, including the number of time slots, may be adjusted dynamically by the CCO. In some embodiments, each CCO typically transmits a beacon in one of the beacon slots within the beacon region every beacon period 210. For example, the CCO 120 transmits a beacon for the centralized network 100 in the first beacon time slot B0 212, while another CCO of another centralized network (not shown) may transmit a beacon for its associated CN at a second beacon slot (not shown). In some embodiments, information or data about the beacon region and/or time slots within the beacon region—for example, the number of beacon slots within the beacon region, the beacon slot ID that the CCO is using to transmit its current beacon protocol data unit, and/or the start and/or end time—are kept by the CCO.

Carrier Sense Multiple Access (CSMA) Region or Contention Period (CP) Region:

The CSMA region 230 is a region wherein any one or more of many contention access protocols are used to share the medium and to coordinate network traffic. In some embodiments, a CSMA/CA protocol may be used. A network may have one or more CP or CSMA regions, which may be non-contiguous with each other. In some embodiments, the CSMA regions 230 of one CN 100 do not overlap with the reserved or contention-free period regions of other centralized networks. Communication, however, between two or more interfering CNs may be made during overlapping CSMA regions.

For each network, a minimum CSMA region immediately following the beacon region 210 is typically supported. The minimum CSMA region, together with other CSMA regions, located elsewhere in the beacon period, for example, may be used or accessed for any or all of the following:

(a) to initiate and/or effect an exchange of priority-based user data between STAs using CSMA, e.g., CSMA/CA;
(b) new STAs, including CCOs, to associate with the network;
(c) existing STAs to exchange management messages with the CCO (e.g., to set up a new link);
(d) new CCOs to exchange management messages to establish new neighbor networks; and
(e) existing neighbor central coordinators to exchange management messages with the CCO (e.g., to share bandwidth, or to change the number of beacon slots).

Furthermore, in some embodiments, the allocation of a minimum CSMA region immediately following the beacon region 210 enables the beacon region 210 to increase or decrease in size without requiring a change in the schedule or locations in time within the frame, particularly of contention-free period time slots. Moreover, the minimum CSMA region enables new devices joining the centralized network to determine a CSMA region, for example, by decoding the central beacon. The new or joining station or device may then transmit network associate request messages, for example, messages requesting that the device be enabled to associate with the centralized network, within this minimum CSMA region or time slots.

Reserved Region or Contention-Free-Period (CFP) Region:

This reserved or CFP region 240 is a period when only devices that have explicit authorization from the CCO are allowed or given permission to transmit. A reserved region 240 is a time interval that is typically reserved by a network. The CN that has been allocated or has acquired control of the reserved region typically schedules the transmission of its contention-free links here. In addition, the CCO may also schedule CSMA allocations that may be used only by the devices in that network. For example, time slot 228 in the reserved region 240 has been allocated by the CCO 120 to STA A 114, so that STA A 114 may freely transmit at that time slot or interval 228 without interference, conflict, or contention from other devices 124, 132 116, 128, 118, 120 within that CN 100. Explained in another way, in that time slot 228, STA A 114 may freely transmit, while other devices 124, 132 116, 128, 118, 120 in that CN 100 are typically silent. This allocation is typically via beacons, such that when a device decodes its own network beacon, information about which station is to use that time slot may be determined. In some embodiments, the CCO sends a message directly to the station informing that device when to transmit and sometimes even when to listen.

A centralized network may have any number of reserved regions in a beacon period. To be compatible, for example, with other centralized networks, when the networks are operating in the coordinated mode, i.e., coordinating with other CNs, the CCO may specify a stayout region in the same time interval, thereby enabling the device with explicit authorization to freely transmit.

Stayout Region:

The stayout region 250 is a period within a time frame when all stations assigned a stayout region are instructed by the primary CCO to remain silent, meaning no transmission. Typically, these devices are also not to use any contention access or contention-free access protocol. A stayout region 250 is assigned to avoid conflicts with a device or the CN that has been assigned a reserved region in the same time interval. In general, a network specifies a stayout region if one or more of the neighboring networks in its interfering network list have specified a reserved or CFP region or a protected region in the same time interval.

In some embodiments of the invention, information about beacon regions, including the number of time slots are kept within the system, typically by the CCO in each network. Information about beacon slot allocations in the beacon region, as well as information about the other regions, in one embodiment, may be exchanged between CCOs, and typically broadcasted in the network. Furthermore, in some embodiments, the various types of regions need not be allocated in one contiguous time interval. This means for example, that the various types of regions may interleave each other, e.g., a time frame or beacon period includes a beacon region, followed by a CSMA region, followed by a stayout region, followed by another CSMA region, and then followed by a reserved region. The various regions within a beacon period may also be of varying sizes with varying number of time slot intervals or durations. In some embodiments, the end time of each region type within a beacon period is stored, for example, in multiples of a defined allocation time unit (e.g., "AllocationTimeUnit"), e.g., 0.32 msec.

Protected Region

In alternative embodiments, a beacon period may include another region type (not shown) called a Protected Region. A network group is typically a collection of one or more centralized networks that have the same system timing, i.e., the beacon periods of these networks align with each other. When a CCO detects the existence of another group with a different timing and if it optionally decides to coordinate with networks in that group, that CCO, in some of the exemplary networks, typically specifies a protected region in the same interval where the beacon region of the other group is located. Stations in, some of the exemplary networks, typically are not allowed to transmit in a protected region. Group coordination, in some embodiments, is optional. A neighboring group of networks, for example, may have a different beacon period start time.

A beacon may also contain other information, not shown in this figure. The beacon may include, for example, identification information of the transmitting device and the station ID of the device that may be allocated a particular time slot, MAC address of the CCO, check sum values, management and control information, and other parameter information. In some embodiments, there are a number of beacon types.

Selection of CCO: CCO Auto-Selection and User-Appointed CCO

In some embodiments, the first station that is powered up in a CN 100 becomes the CCO. This CCO thus performs the network scheduling and management activities of the CN. This first STA/CCO also periodically transmits a beacon specifying the schedules of the network, as part of its CCO functions.

When other stations are powered up, however, these stations may join the existing CN by exchanging association messages with the CCO. As the CN evolves with more stations joining or leaving the CN, another station may be determined, based on a set of conditions or criteria, to be more suitable to fulfill the role of the CCO. In some embodiments, all stations joining the CN are all adapted to function as a primary CCO if appointed. In some embodiments, the CN may include plain stations or non-CCO capable stations that are not adapted to function as a CCO. For illustrative purposes, however, all the stations in the CN 100 in FIG. 1 are adapted to perform CCO functions.

In some embodiments, the current CCO applies, on an ongoing basis, a CCO auto-selection process to identify the best or better-suited STA within the CN to perform the CCO functions. This CCO auto-selection procedure may be performed automatically and may be performed without user intervention and/or awareness. In some embodiments, all stations that are adapted to function as a CCO are also adapted to support the CCO auto-selection process described herein. Once, the auto-selection process identifies the best-suited STA to function as the next CCO, the CCO typically initiates a handover process with the identified STA or the new CCO.

One exemplary alternative to the CCO auto-selection is the user-appointed CCO. In this embodiment, the CCO is appointed by the user. Once the user identifies the STA to function as the next or new CCO, the current CCO then initiates a handover process with the user-identified STA or new CCO.

User-Appointed CCO

Figure 3A:
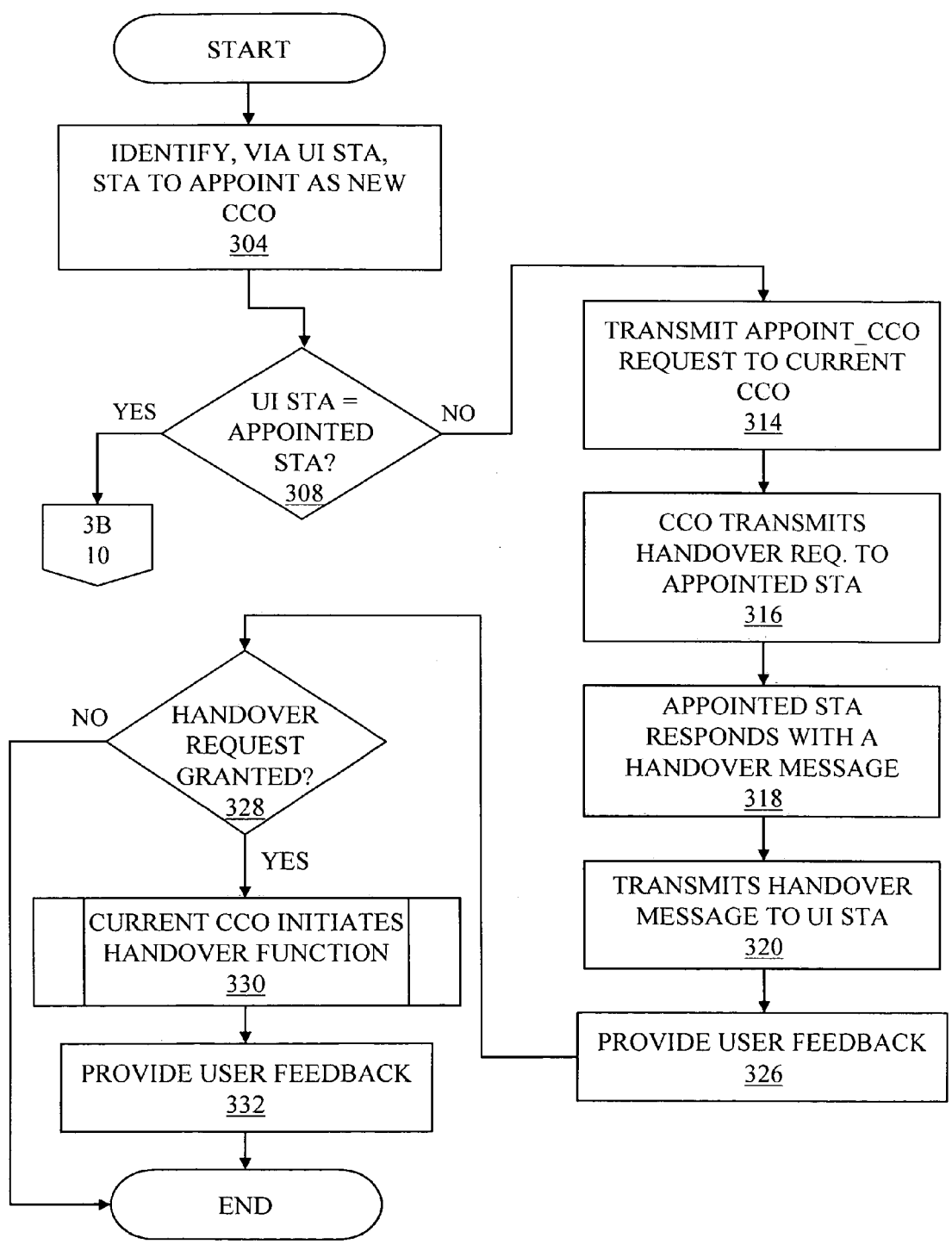
FIGS. 3A and 3B illustrate a flowchart showing an exemplary process by which a user may appoint a central coordinator (CCO), according to an embodiment of the invention.
Figure 3B:
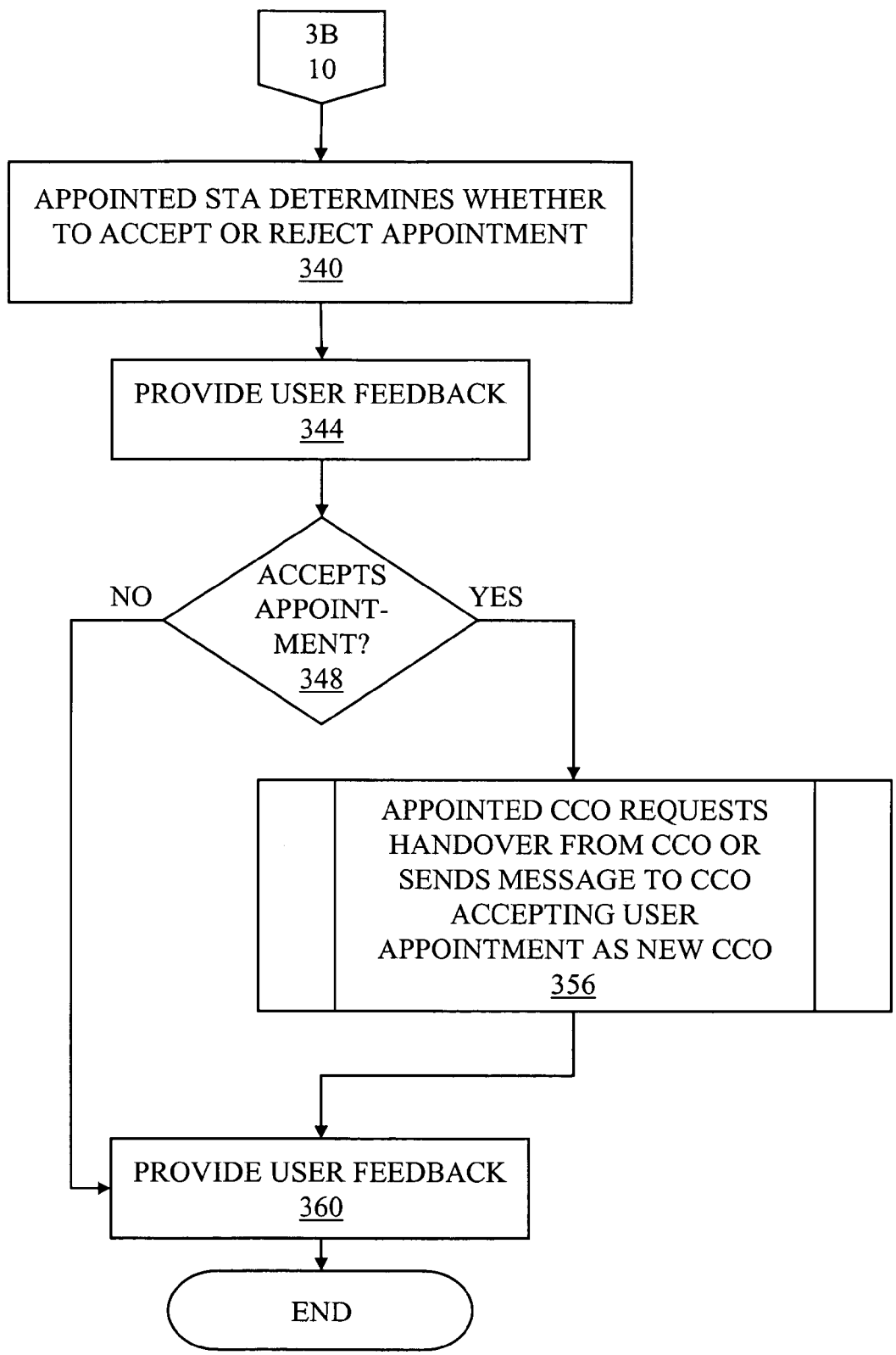
Figure 4:
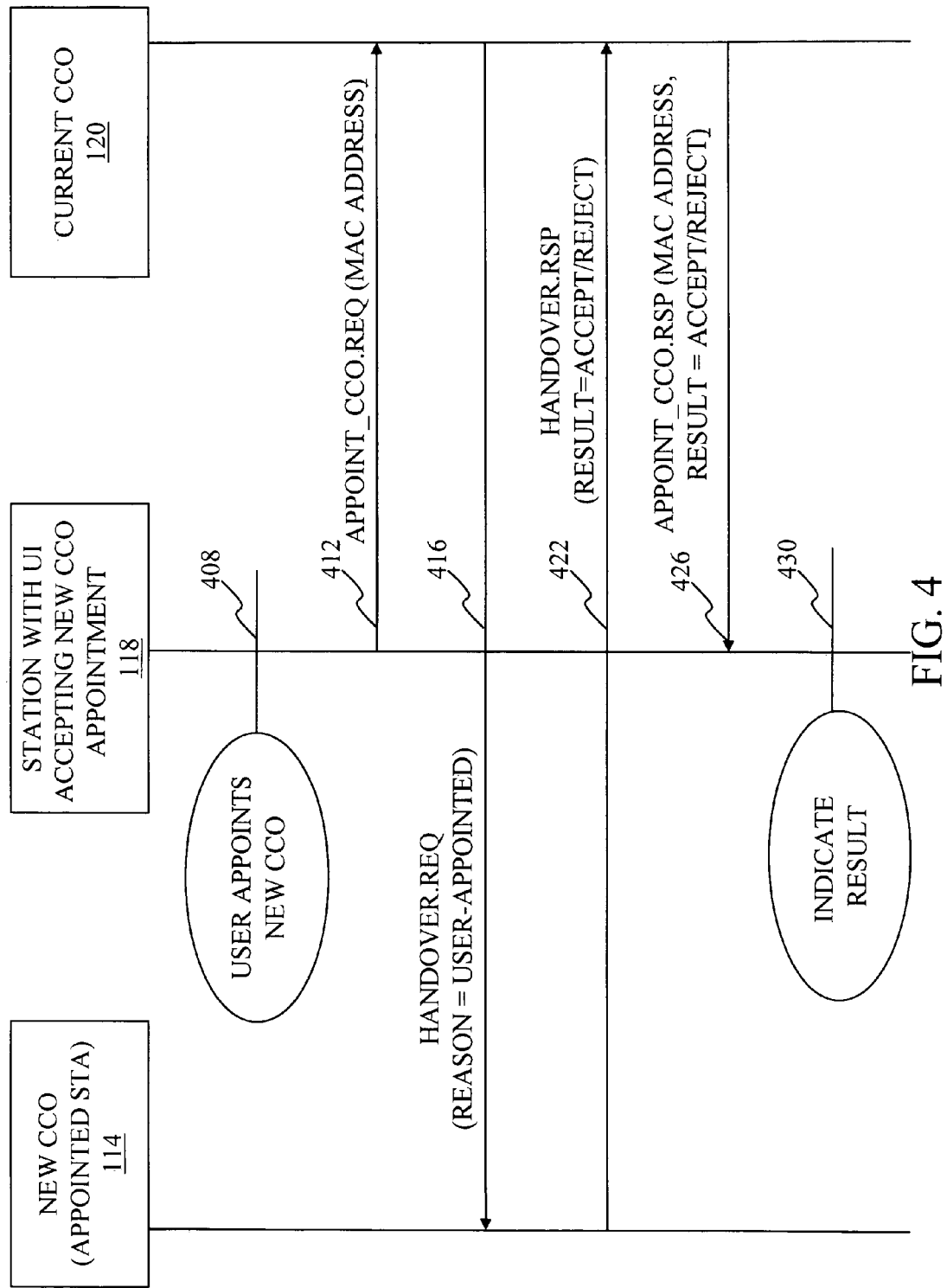
FIG. 4 is a data flow diagram showing exemplary exchanges of messages to perform CCO selection, according to an embodiment of the invention.

FIGS. 3A and 3B together illustrate a high-level flowchart showing exemplary operations that a user may execute to manually appoint a new CCO. FIG. 4 is an exemplary data flow diagram showing exemplary messages being exchanged to appoint a STA to become the new CCO. FIGS. 1, 3A, 3B, and 4 are discussed in conjunction with each other. Referring to FIGS. 3A, 3B, and 4, in the first operation, a user identifies or appoints the STA to become the new CCO 408 (step 304). This operation is typically performed via a user interface (UI) that is adapted to receive user input, such as keyboard entries, mouse entries, voice commands, and the like. This user interface is typically a graphical user interface that is presented to a user based on a set of program instructions running in a processor, such as a computer. In the exemplary CN 100, this UI is presented on a monitor that is operably coupled to a computer, for example, STA F 118. In some embodiments, the user identifies the station to become the new CCO by its media access control (MAC) address. In some embodiments, other STA-identifying information may also be used, for example, a station short name ID that has been supplied by the CCO or a temporary equipment identifier. A manner in which a user may distinctly identify the station that is going to be appointed as a new CCO is typically applied so as to uniquely identify the appointed station to the UI station 118 and the CCO 120.

In the next operation, a determination is made as to whether the UI station, that is the station with which the user is interfacing so as to enable the user to appoint the STA to become the new CCO, is the same STA as the user-appointed STA (decision 308). If the UI STA is not the same as the appointed STA, the UI STA 118 typically communicates with the existing or current CCO via an appointment message indicating to the CCO which STA the user has appointed to become the new CCO (step 314). In some embodiments, this may be performed by sending an APPOINT_CCO.REQ message 412, which includes the MAC address of the station, which the user has selected/appointed to become the new CCO. The current CCO then responds by querying the appointed station with a message requesting the initiation of the handover process, i.e., requesting the appointed STA to perform the role of the current CCO (step 316). In some embodiments, this may be performed by having a CCO transmit a HANDOVER.REQ message, which typically also indicates that the handover is initiated by user appointment 416, as opposed to being via the CCO auto-selection process or that the current CCO has disassociated or has left the CN 100. A handover may be initiated because the user has appointed a new CCO, the CCO has selected a new CCO applying the CCO auto-selection process, or the current CCO left the network.

The appointed station identified by the user then responds, either rejecting or accepting the handover request (step 318). In some embodiments, this may be performed by sending a HANDOVER.RSP, i.e., a handover response message, indicating that the appointed STA either accepts or declines the transfer of the CCO function 422. The current CCO then typically passes or relays the handover response received from the appointed STA back to the UI station so as to notify the user (step 320). In some embodiments, this may be performed by having the CCO transmit an APPOINT_CCO.RSP message, which may include the MAC address of the appointed STA and the response of the appointed STA, i.e., accept or reject the new CCO appointment 426. A user feedback 430, such as a display indicating that the appointed CCO has accepted or rejected the appointment may be provided to the user, e.g., via the UI STA (step 326).

If the response from the user-appointed STA is positive (decision 328), i.e., handover request accepted, the existing or current CCO then initiates a handover process with the appointed STA (step 330). A user feedback, for example, indicating to the user that the handover process is successful may also be provided to the user (step 332). If the appointed STA or new CCO, however, rejects the handover request, the CCO performs no further action and continues in its role of being the current CCO.

In some embodiments, if the UI STA is also the appointed STA or new CCO (decision 308), the appointed STA makes a determination whether to accept or reject such appointment (step 340). A feedback, such as a display, may be provided to the user so as to inform the user whether the appointed STA accepts or rejects such request (step 344). If the appointed STA accepts the appointment request, the appointed STA may transmit a message to the CCO requesting the initiation of the handover request (step 356). This message may also indicate the identity of the appointed STA, e.g., MAC address, and that the appointment is via a user-appointment process. A feedback to the user, for example, indicating a successful handover from the current CCO to the appointed STA functioning now as the new and current CCO may also be provided to the user (step 360). If the appointed STA, however, rejects the user-appointment to function as the new CCO, the current CCO remains performing its CCO functions.

In some embodiments, once the CCO receives the message from the appointed STA indicating that the appointed CCO is able to accept the function as the CCO (step 348), the CCO then initiates the handover process with the appointed STA, without the appointed CCO requesting the initiation of the handover process (step 356). The message sent by the appointed STA to the CCO thus indicates that a handover process is to be initiated by the CCO.

In some embodiments, a user-appointed CCO typically does not perform the CCO auto-selection process further described herein. A user-appointed CCO may only transfer or handover its CCO role to another user-appointed CCO, via the exemplary handover process described herein. In some embodiments, to safeguard improper CCO handover functions, the user-appointed CCO process may only be provided to advanced users of the system/network.

CCO Auto-Selection Process

Figure 5:
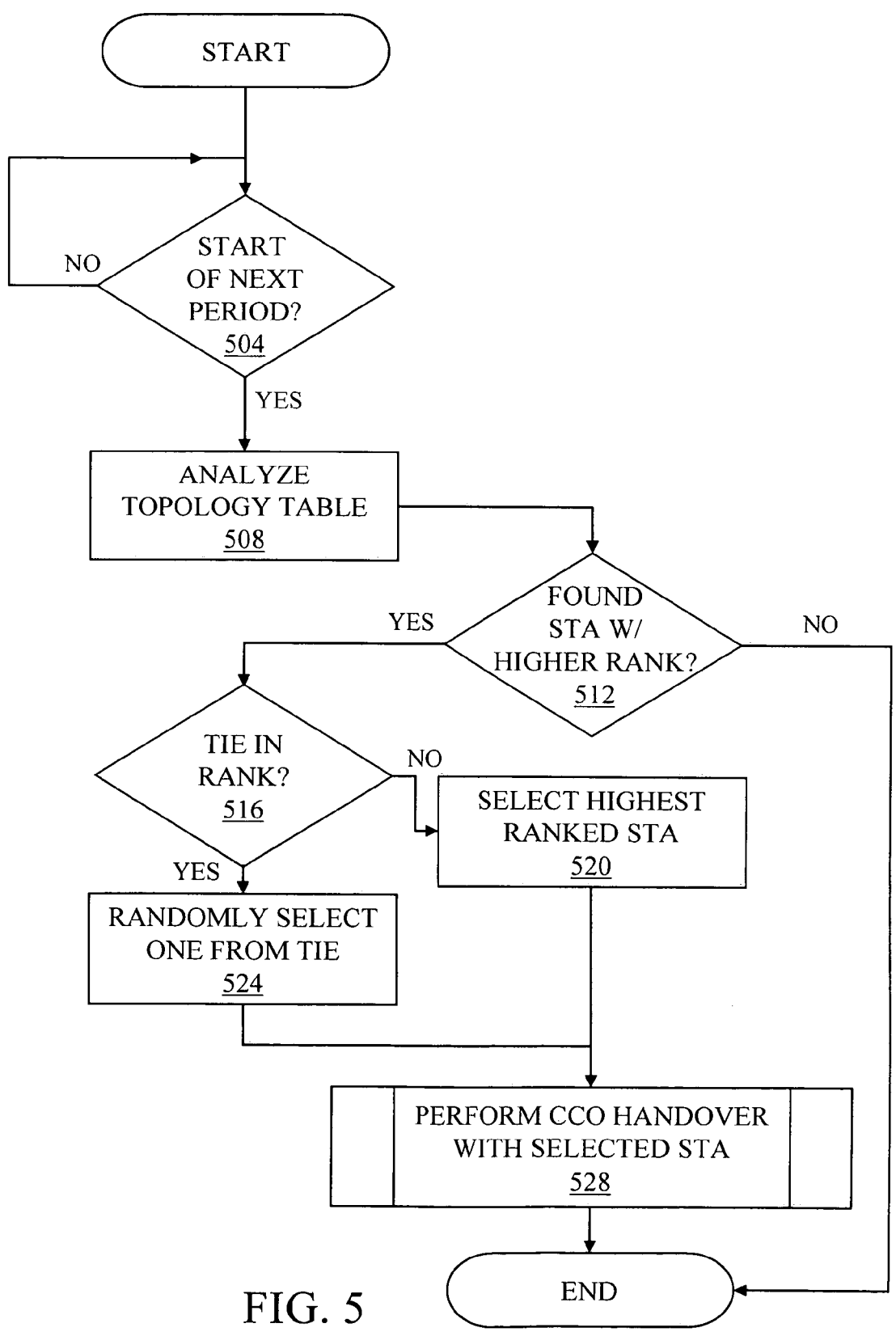
FIG. 5 is a flowchart showing an exemplary CCO auto-selection process, according to an embodiment of the invention.

FIG. 5 is a flowchart showing an exemplary embodiment of the CCO auto-selection process, according to some embodiments of the invention. A current CCO, that is not user-appointed, typically periodically performs a CCO auto-selection process, e.g., once every defined period or within a defined condition. The CCO auto-selection process is also typically performed on an ongoing basis. If the auto-selection process has not been invoked for that period (decision 504), for example, the current non-user-appointed CCO first typically analyzes the topology table typically associated with and maintained by that CCO. This topology table is typically associated with the CN 100 managed by the CCO. In some embodiments, this topology table analysis is performed once every maximum discover period, as defined within the system.

In some embodiments, the topology table of the CCO associated with the CN may include a list of stations and networks discovered by the CCO and/or other stations within the CN. In some embodiments, the topology table contains the MAC addresses of all STAs and the network identifiers of all discovered CNs. In other embodiments, the topology table also includes every STA associated with and authenticated by the CCO.

In some embodiments, each STA in the CN is scheduled by the CCO to transmit a special form of beacon called the discover beacon at least once every maximum discovery period, as defined within the system. The discover beacon enables other STAs in the CN 100 and in other CNs to discover STAs-via the discover beacons. STAs receiving discover beacons from other STAs typically update their lists of discovered stations, as well as their lists of discovered networks, by adding to their lists the STAs transmitting the discover beacons, and their corresponding CN identifiers. Typically, the discover beacon includes information about the transmitting STA, such as the identity of the transmitting STA and the CN within which the transmitting STA belongs.

A discover beacon may also contain, either separately or in combination, the following information concerning the transmitting station:
  a) CCO capability of the transmitting station: minimal CCO capability or preferred CCO;
  b) Number or count of discovered stations: this is the count of stations in the CN that was discovered by the transmitting STA; and
  c) Number or count of discovered networks: this is the count of CNs that was discovered by the transmitting STA.

To discover each STA's list of discovered STAs and discovered networks, the CCO may periodically request the STAs in the CN to provide to the CCO their lists of discovered STAs and CNs. This request, for example, may be via an exemplary DISCOVER_LIST.REQ message. These lists of discovered STAs and CNs from the various STAs in the network are then typically used by the CCO to create and update its topology table. STAs may respond to the CCO's request via an exemplary response, e.g., a DISCOVER_LIST.RSP message.

Table I below is an exemplary discover list response format, sent by a STA in response to a CCO's query for such STA's list of discovered stations and CNs.

TABLE I

Exemplary DISCOVER_LIST.RSP Message (Response to exemplary DISCOVER_LIST.REQ Message)

| Field | Bits | Definition |
|---|---|---|
| NumStation | 8 | Number/Count of stations discovered (=M). |
| StationInfo[1] | var | Information about the first station discovered (see Table II below). |
| ... | ... | ... |
| StationInfo[M] | var | Information about the last station discovered (see Table II below). |
| NumNetwork | 8 | Number/Count of centralized networks discovered (=N). |
| NID[1] | 48 | Network Identifier of the first network discovered. |
| ... | ... | ... |
| NID[N] | 48 | Network Identifier of the last network discovered. |

TABLE II

Exemplary format of StationInfo Field (Station Information)

| Field | Bits | Definition |
|---|---|---|
| MACAddr | 48 | MAC address of the discovered station |
| TEI | 8 | Temporary Equipment Identifier of the discovered station |
| CCO Capability | 2 | CCO capability of the station. ("00" = Not CCO-Capable; "01" = Minimum CCO Capability; "10" = Preferred CCO Capability; "11" = Reserved) |
| SameNetwork | 1 | "0" = the discovered station is associated with a different centralized network "1" = the discovered station is associated with the same centralized network |
| NID | 48 | Network Identifier of the network that the discovered station belongs to. (In some embodiments, this field is typically present or provided only if not within the same centralized network.) |

Table III shows a portion of an exemplary topology table, format and data, for the CCO 120. Other information may also be included or determined from information contained in the topology table, such as whether the communication link is bi or uni-directional. In some embodiments, the topology table also contain the connectivity information of all stations, e.g., how many and which stations and CNs each station is able to detect.

TABLE III

Exemplary CCO Topology Table Format and Data

| Exemplary List of Associated and Authenticated STAs | Discovered STA Lists | Discovered Network Lists |
|---|---|---|
| MAC ADDRESS(CCO) | {MAC ADDRESS(A), MAC ADDRESS(B), MAC ADDRESS(C)} = STAs discovered by the CCO | {NID(NCo)} CNs discovered by the CCO |
| MAC ADDRESS(A) | {MAC ADDRESS(CCO), MAC ADDRESS(B), MAC ADDRESS(C), MAC ADDRESS(E)} = STAs discovered by STA A | {empty} CNs discovered by STA A |
| MAC ADDRESS(B) | {MAC ADDRESS(CCO), MAC ADDRESS(A), MAC ADDRESS(C), MAC ADDRESS(D), MAC ADDRESS(E)}= STAs discovered by STA B | {empty} CNs discovered by STA B |
| MAC ADDRESS(C) | {MAC ADDRESS(CCO), MAC ADDRESS(A), MAC ADDRESS(B)} = STAs discovered by STA C | {empty} CNs discovered by STA C |
| MAC ADDRESS(D) | {MAC ADDRESS(B), MAC ADDRESS(E)} = STAs discovered by STA D | {empty} CNs discovered by STA D |

Based on the analyzed topology table, the CCO determines if there are any STAs in the CN 100, which are ranked higher than the current CCO (decision 512). Typically, each STA adapted to perform CCO functions may be associated with a rank. In some embodiments, rules of precedence are applied to all STAs in the CN to rank their suitability or preference in assuming the CCO role. If one or more STAs are identified to rank higher than the CCO, a determination is then made whether two or more identified stations have the same highest rank (decision 516). If there is no tie in rank, the CCO may select the STA with the highest rank from the set of STAs identified with ranks higher than the CCO (step 520). If there is a tie in rank between two or more STAs, i.e., these STAs are determined to have the same highest ranking above the CCO's rank (decision 516), the CCO may randomly select one STA from those STAs tied in rank STAs (step 524). The CCO performs a CCO handover process with the selected STA (step 528). Typically, the current CCO does not initiate or perform a handover process with a STA that is ranked at or below the rank of the CCO.

CCO Capability

Typically, each STA performs the basic functions typically required of a STA, for example, receiving and responding to certain messages, decoding beacons and following beacon schedules, and the like. STAs may also be adapted to perform basic and/or mandatory CCO functions. Some STAs, however, may be configured to perform certain functions that other STAs are not adapted to perform. These configurations, in some embodiments, may be based on manufacturer design or implementation.

In some embodiments, the CCO-capability of STAs may be classified into two categories:
  a) Minimum CCO Capability: The STA is adapted to only perform CCO mandatory and/or basic functions.
  b) Preferred CCO Capability: The STA is adapted to perform CCO mandatory and/or basic functions, and other optional CCO functions, as configured based on system design and implementation.

Typically, each STA is adapted to have at least the minimum CCO capability. The CCO-capability classification of each STA may be provided to the CCO, for example, upon that STA's request to associate with the existing CN. In some embodiments, the STA's CCO-capability classification may be included as part of the discover process, e.g., via a discover beacon in response to a discovery query. In some embodiments, every STA declares its CCO-capability classification to the CCO, for example, when requested directly or indirectly by the CCO. Typically, the CCO also maintains or records the CCO-capability classification of each associated STA in the CN in its topology table.

Rules or Order of Precedence

Table IV below shows an exemplary set of rules or order of precedence that may be applied to determine the most suitable STA to perform the role of the CCO via the exemplary CCO auto-selection features of the present invention.

TABLE IV

Rules or Order of Precedence Applied in CCO Auto-Selection

| Order/Rank (1 = Highest, 5 = Lowest) | Criteria | Note |
|---|---|---|
| 1 | User-Appointed CCO | If the user-appointed STA accepts the CCO function/role, this STA remains the CCO. |
| 2 | CCO Capability | Preferred CCO-capable STA ranks higher than Minimum CCO-capable station. |
| 3 | Number or Count of discovered stations in the Discovered Station List | Higher number/count is preferred |
| 4 | Number or Count of discovered networks in the Discovered Network List | Higher number/count is preferred |
| 5 | Other criteria, e.g., vendor or manufacturer's criteria | |

Where, in accordance with the exemplary rules:
  a) User-Appointed CCO may be ranked the highest.
  b) The CCO-capability of a STA may be the next highest criterion for ranking stations. A station with a preferred CCO capability classification may be ranked higher than a station with minimum CCO capability classification.
  c) The number/count of stations in the discovered station list of a station may be the next highest criterion in ranking a station's suitability. The station in the CN that supports bi-directional links with the maximum number of stations typically provides the best coverage and may be deemed more suitable to be a CCO. The station in the topology table with the greatest number/count of stations in its discovered station list may be ranked the highest in this criterion.
  d) The number/count of networks discovered by a station may be the next most important ranking criterion. The station in the network that discovers the greatest number of neighbor networks may be deemed more suitable to be a CCO to coordinate with the neighbor networks. In some embodiments, the station in the topology table with the greatest number of entries in the discovered network list is typically preferred.
  e) Other criteria, e.g., vendor's criteria, may also be used, and are typically ranked lowest in rank.

Figure 6:
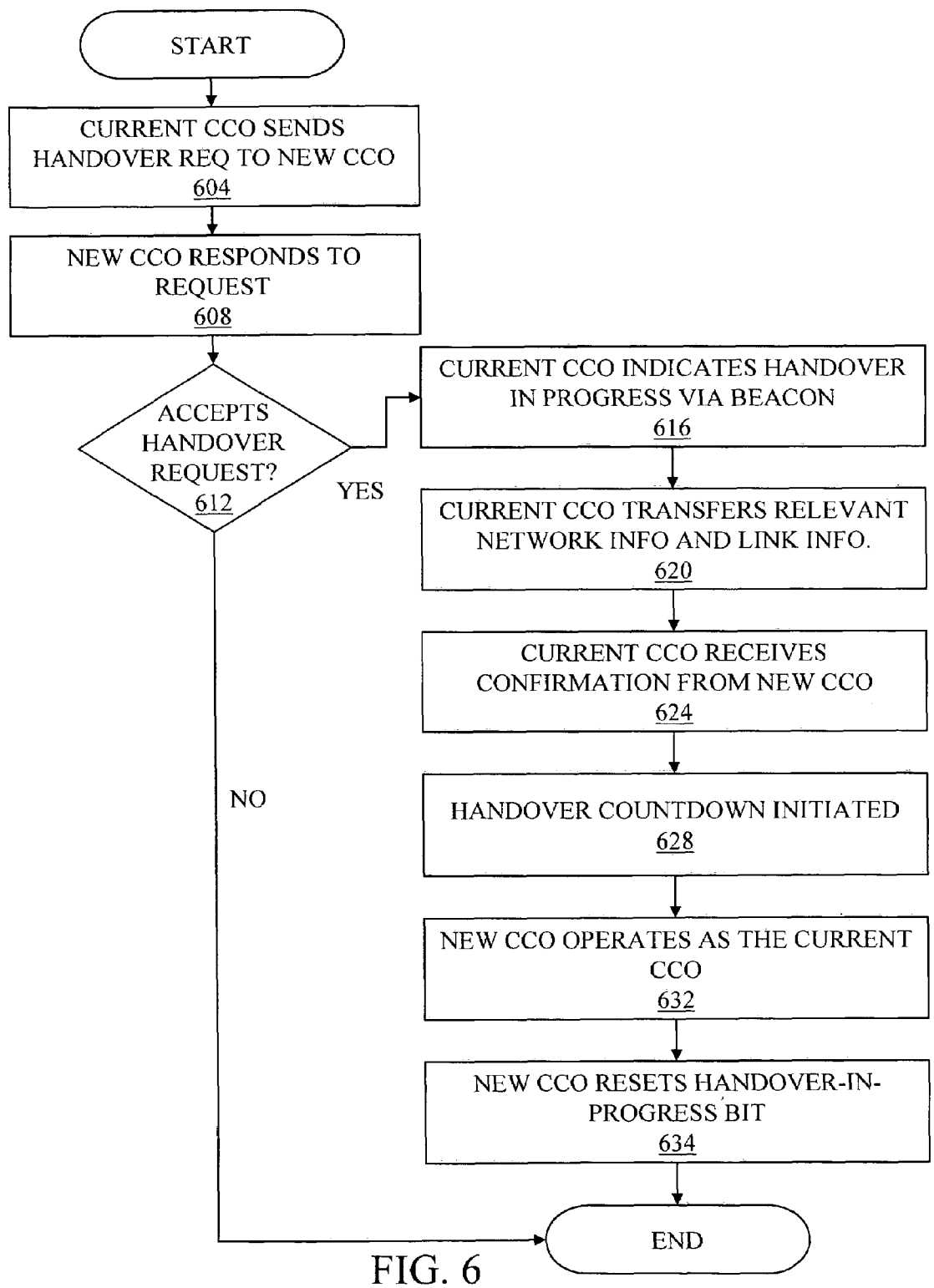
FIG. 6 is a flowchart showing an exemplary handover process, according to an embodiment of the invention.
Figure 7:
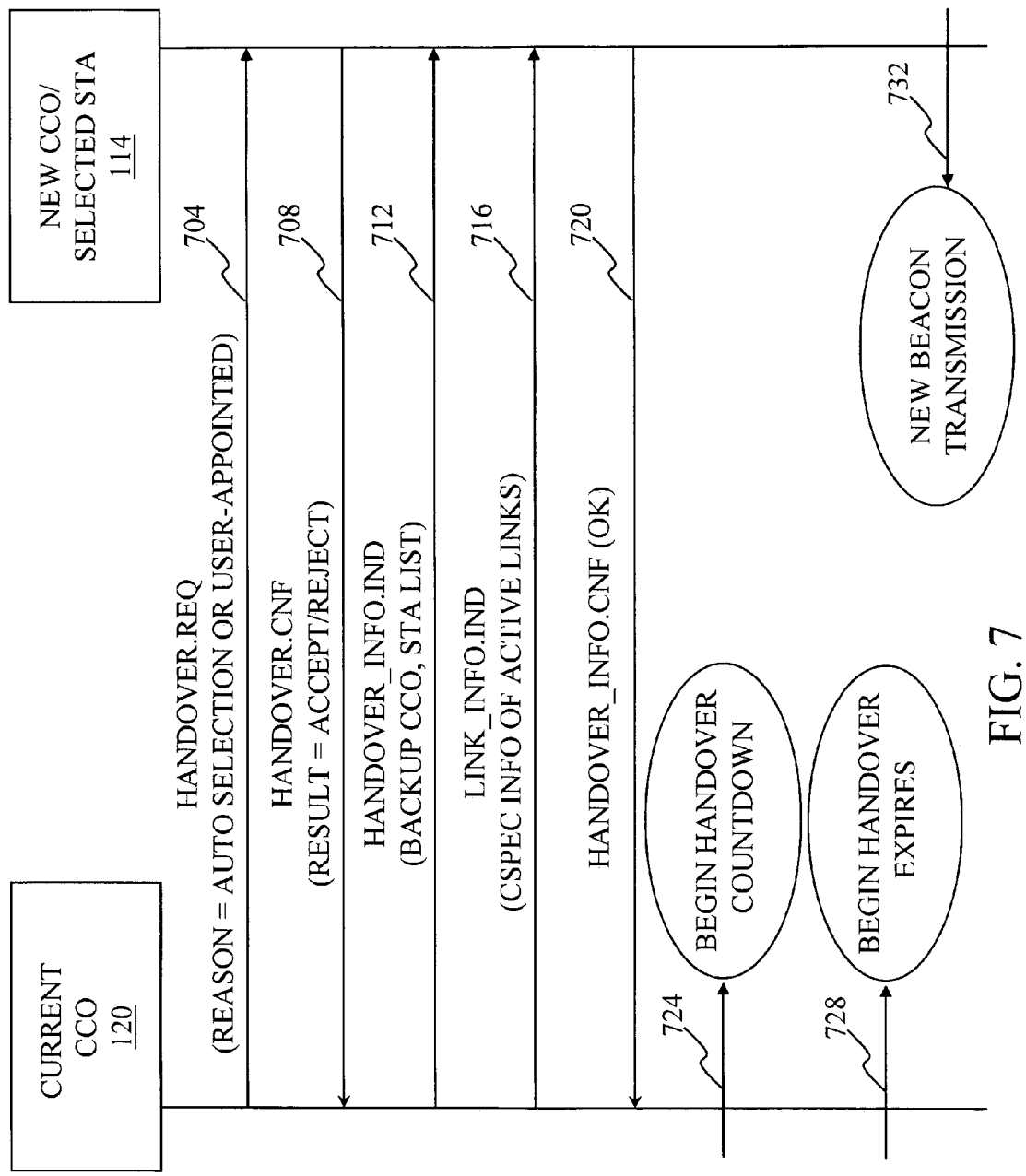
FIG. 7 is a data flow diagram showing exemplary exchanges of messages to perform the handover feature, according to an embodiment of the invention.

FIG. 6 shows an exemplary flowchart illustrating the process of transferring the current CCO functions to a new CCO, i.e., the CCO-role handover process. FIG. 7 shows exemplary exchanges of exemplary messages to perform a handover process, according to some embodiments of the invention. The handover process may be initiated when a CCO selection process has occurred, e.g., via user appointment or via the CCO auto-selection process. In some embodiments, the current CCO and the new CCO maintain uninterrupted service at the agreed upon quality of service (QoS) level for all active connections, during and/or after the handover process. FIGS. 6 and 7 are discussed together, in the following exemplary embodiments.

In the first operation, the current CCO sends a handover request to the user-appointed/selected or auto-selected CCO, requesting that the selected STA perform the role of the new CCO (step 604). In some embodiments, this may be performed by sending a HANDOVER.REQ message 704, which may include the reason of the handover, e.g., user-appointment or via the auto-selection process. In some embodiments, the handover process may be initiated because the current CCO is disassociating and/or is leaving the CN 100. The selected STA may then respond with a confirming message, indicating whether that STA accepts or declines the request to transfer the CCO functions to it (step 608). This may be performed by sending a response message, e.g., a HANDOVER.CNF message 708, indicating acceptance or rejection. If the selected STA rejects the handover request (decision 612), the handover process is completed.

If the station, however, accepts the handover request (decision 612), the current CCO continues with the following steps. The current CCO typically sets a handover-in-progress flag, e.g., bit in the beacon to indicate to STAs in the CN that a handover is in progress (step 616). When this bit is set, the CCO typically does not accept any new association requests or bandwidth requests. Stations in the CNs typically wait before sending new requests to the current CCO. In addition, the current CCO initiates a transfer of relevant network-management information, including list of stations associated with the CN, active link(s) information, to the new CCO (step 620). In some embodiments, this is performed by having the CCO send one or more messages, e.g., a HANDOVER_INFO.IND message 712, which may contain the identity of the backup CCO and the list of associated and authenticated STAs in the network.

Table V shows an exemplary format of an exemplary HANDOVER_INFO.IND message 712, containing network-management information. This message typically contains the identity of the backup CCO and the list of associated and authenticated STAs in the CN.

TABLE V

Exemplary HANDOVER_INFO.IND Message

| Field | Bits | Definition |
|---|---|---|
| BackupCCO | 8 | Temporary Equipment Identifier (TEI) of the Backup CCO. |
| Num | 8 | Number of Station_Info[ ] fields to follow (=N). |
| Station_Info[1] | 64 | Information of the first station. (See Table VI below) |
| ... | | |
| Station_Info[N] | 64 | Information of the last station. (See Table VI below) |

TABLE VI

Exemplary Station_Info Format associated with the exemplary HANDOVER_INFO.IND Message

| Field | Bits | Definition |
|---|---|---|
| MACAddr | 48 | MAC address of the station. |
| TEI | 8 | TEI of the station. |
| CCO Capability | 2 | CCO capability of the station. ("00" = Not CCO-Capable; "01" = Minimum CCO Capability; "10" = Preferred CCO Capability; "11" = Reserved) |
| State | 8 | State of the station. "0" = associated "01" = authenticated 0x02 to 0xFF = reserved |

Furthermore, in some embodiments, the CCO may send a LINK_INFO.IND message to the new CCO 716. This exemplary LINK_INFO.IND message may include QoS requirement and channel characteristic information about all active links in the networks. Table VII illustrates an exemplary LINK_INFO.IND message format 716.

TABLE VII

Exemplary LINK_INFO.IND Message Format

| Field | Bits | Definition |
|---|---|---|
| Num | 8 | Number of LinkInfo fields to follow (=N). |
| LinkInfo[1] | Var | Link information of the first link owned by the sender. (See Table VIII below). |
| ... | ... | ... |
| LinkInfo[N] | Var | Link information of the last link owned by the sender. (See Table VIII below). |

TABLE VIII

Exemplary LinkInfo Field Format

| Field | Bits | Definition |
|---|---|---|
| CID | 16 | Connection ID of the link |
| STEI | 8 | TEI (terminal equipment identifier) of the source station. |
| DTEI | 8 | TEI of the sink station. |
| LID-F | 8 | Link ID of the forward link. |
| LID-R | 8 | Link ID of the reverse link. |
| QoS | var | QoS Requirement. |
| Channel Char | var | Channel characteristic. |

The new CCO then responds to the current CCO (step 624), indicating whether the information transmitted to the new CCO 712, 716 has been received. This may be performed, for example, by having the new CCO send an exemplary HANDOVER_INFO.CNF message 720 with a successful result code after the new CCO has received the HANDOVER_INFO.IND 712 and LINK_INFO.IND 716 messages from the current CCO.

Table IX below shows an exemplary format for a HANDOVER_INFO.CNF message, which is typically sent by the new CCO to the current CCO during the handover process to confirm the reception of the HANDOVER_INFO.IND and LINK_INFO.IND messages.

TABLE IX

Exemplary HANDOVER_INFO.CNF Message Format

| Field | Bits | Definition |
|---|---|---|
| Handover_Info | 1 | "0" = HANDOVER_INFO.IND message has been received correctly. "1" = Request retransmission of HANDOVER_INFO.IND message. |
| Link_Info | 1 | "0" = LINK_INFO.IND message has been received correctly. "1" = Request retransmission of LINK_INFO.IND message. |

Upon receiving a response message with a successful code 720 from the new CCO, the current CCO initiates a handover countdown 724 typically indicated via one or more beacons (step 628). When the handover countdown expires 728, the current CCO stops transmitting the beacon and the new CCO takes over the CCO beacon transmissions 732. The new CCO thus operates or functions now as the current CCO (step 632). The new/current CCO also resets the handover-in-progress bit in the beacon, indicating the end of the handover process (step 634).

The new/current CCO also typically maintains the schedule of the last beacon transmitted by the "old" or previous CCO. In order to maintain uninterrupted service for ongoing connections, the devices or STAs in the CN determines or are informed of the timing offset between the new CCO's clock and the "old" CCO's clock.

In some embodiments, a CCO typically transmits a time stamp in the beacon and all the STAs are synchronized to this time. When the CCO changes, e.g., the CCO role is handed over to another CCO, there is a change in the time stamp because of the difference between the local clocks of the new and old CCOs. In some embodiments, the STAs apply a time offset in the time frame when the switch, i.e., change of CCOs, becomes active. In some embodiments, the timing offset between the old CCO and the new CCO may be made known to other stations either by specifying the offset in the beacon(s) or by other message exchanges. In other embodiments, other stations in the CN may use the "time stamp" values in the beacons transmitted by the old CCO and the new CCO to compute the timing offset.

Backup CCO and CCO Failure Recovery

In some embodiments, every station that becomes the CCO identifies a STA in the CN, if available, to function as the backup CCO. In some embodiments, this may be performed by having the CCO send a message requesting a station to function in the role of a backup CCO. In some embodiments, this may be performed via an exemplary APPOINT_BACKUP.REQ message, which may indicate whether that request is a request for an appointment of the STA to become the backup CCO or a request or message indicating to that STA that it is released from its backup CCO role. Typically, the STA, receiving this backup CCO appointment/release message, responds back to the CCO with a message indicating whether the appoint/release message or request has been accepted or rejected/failed.

The backup CCO may be selected, e.g., by the current CCO, by an analysis of the topology table using the same or similar criteria or set of rules of precedence, described herein and in exemplary Table IV above. The backup CCO may be the STA that is next lower in rank from the auto-selected CCO, e.g., most suitable STA to perform the role of the CCO but is not the auto-selected CCO. If there is a tie in rank with the auto-selected CCO, the other STA not selected to be the current CCO may be selected to perform the backup CCO role. Unlike the CCO-auto selection process, the CCO does not select the backup CCO on a periodic basis. Typically, the CCO evaluates an alternate backup CCO when the current backup CCO dissociates from or leaves the CN.

During a handover process, the new CCO is typically informed of the identity of the backup CCO, e.g., in the HANDOVER_INFO.IND message 712 (see Table V above). The new CCO may choose to appoint a new station as the backup CCO, based on one or more criteria, e.g., based on a set of one or more rules of precedence. When a new CCO chooses a different station to be the backup CCO, the new CCO informs the current backup CCO via an exemplary message, e.g., the APPOINT_BACKUP.REQ message, releasing such backup CCO of its current backup CCO role. The new CCO backup is also typically sent a message requesting such STA to perform the role of the backup CCO. The function of the backup CCO is to typically perform the role of the CCO in the event of a CCO failure.

CCO Failure Recovery

Figure 8:
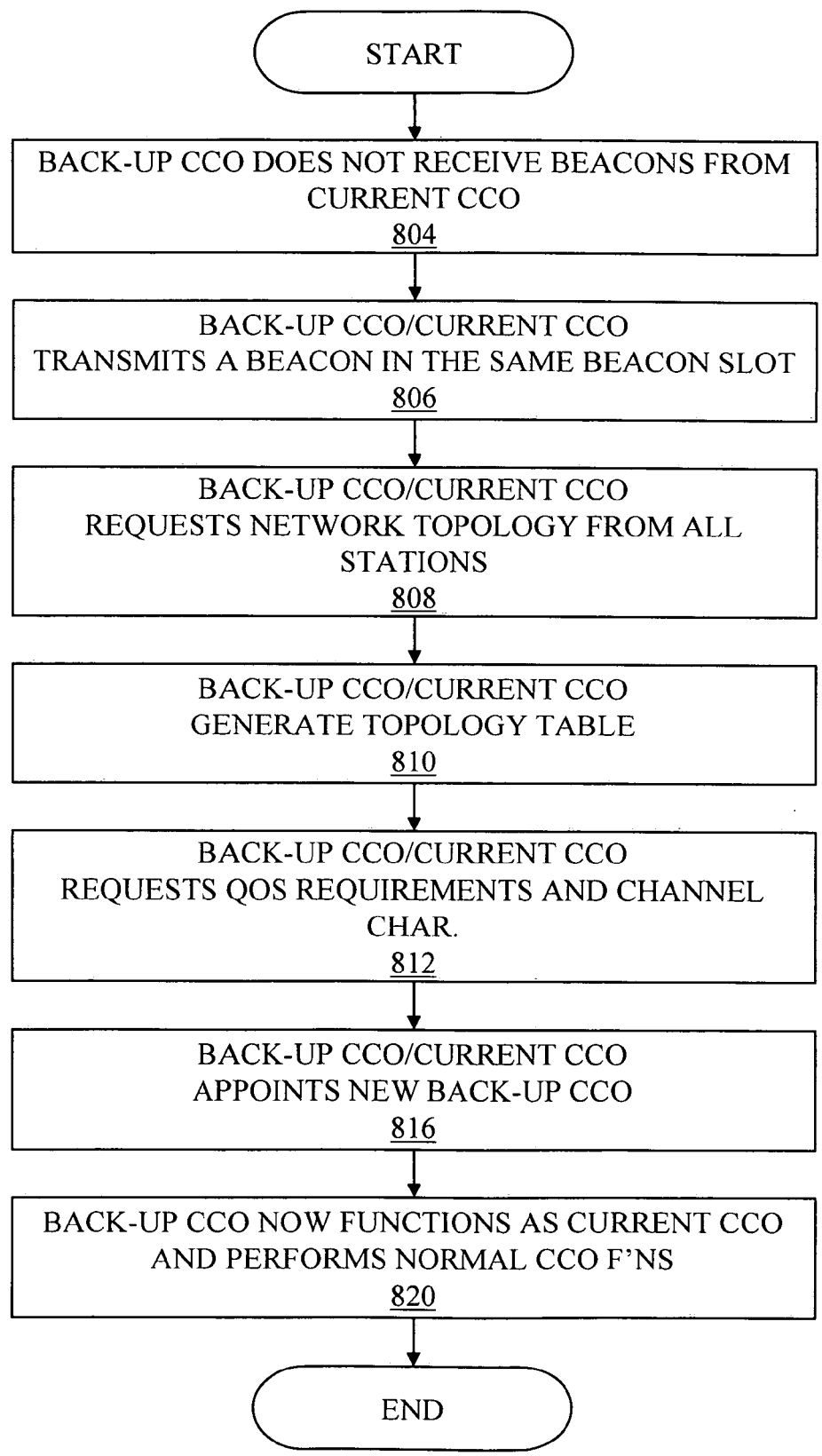
FIG. 8 is a flowchart showing an exemplary process by which a backup CCO takes over the functions of the current CCO.

FIG. 8 shows a flowchart showing an exemplary manner in which a backup CCO may perform or assume the role of the current CCO. Situations or conditions in the CN may make it possible for the current or existing CCO to drop out of the CN without warning, e.g., because of equipment failure, a local power line failure, or because the user unknowingly unplugged the station that was serving as the CCO. For the backup CCO to perform the role of the CCO, the backup CCO determines if the current CCO has failed or is no longer available, by listening, receiving, and/or processing the beacons periodically sent by the CCO within each beacon period (step 804). Thus, if the backup CCO does not receive any beacons from the current CCO, e.g., within a defined number of beacon periods, the backup CCO performs the role of the new CCO, i.e., performing CCO functions.

To perform the role of the new CCO, the backup CCO typically transmits a beacon in the same beacon slot in the beacon region occupied by the previous operating CCO (step 806). The timing offset between the old, no longer available, CCO and the backup CCO may be made known to other stations either by specifying the offset in the beacon itself or by other message exchanges. In some other embodiments, where beacons have time-related values or "time stamps," other stations in the network may use the "time stamp" values in the beacons transmitted by the old CCO and the backup CCO to compute the timing offset.

In some embodiments, the backup CCO, now functioning as the current CCO, also maintains the persistent schedule of the last received beacon. Persistent schedules/allocations typically remain valid for a number of beacon periods, e.g., one or more beacon periods as defined within the system. Non-persistent schedules/allocations, on the other hand, are typically valid for the current beacon period only. For example, persistent CFP schedule is provided to all sessions requiring guaranteed QoS, so as to provide these sessions with sufficient amount of time and resources during each beacon period to deliver their data and meet their loss rate and latency requirements. Since it is possible for a station to miss or not detect a beacon, this schedule is made persistent.

The new CCO/backup CCO also requests topology information from all stations in the network using, for example, a discover request message (step 808). An exemplary discover request message is the DISCOVER_LIST.REQ message, which is sent by a STA or the CCO to another STA to request that STA's discovered station list and discovered network list. The STA receiving such request may respond to this discover request message, for example, by responding with a DISCOVER_LIST.RSP message (see Table I above).

Based on the requested topology information, the new CCO typically generates its own topology table for the CN and associated with the new CCO (step 810). The new CCO also requests the QoS requirement and channel characteristic information of contention-free links in the schedule from the stations involved (step 812). In some embodiments, this may be performed by sending an exemplary LINK_INFO.REQ message, which is sent by a STA to request the connection specification (CSPEC) and the bit loading estimate (BLE) information of links that are owned by the receiving STA. Table X below shows exemplary information contained in the LINK_INFO.REQ message.

TABLE X

Exemplary LINK_INFO.REQ Message Format

| Field | Bits | Definition |
|---|---|---|
| Num | 8 | Number of LID fields to follow (=N). If N=0, the sender is requesting information about all links. |
| LID[1] | 8 | Link ID of the first link whose information is requested. |
| ... | ... | ... |
| LID[N] | 8 | Link ID of the last link whose information is requested. |

The STA receiving such a request for CSPEC and BLE information may respond in an exemplary LINK_INFO.RSP message, which is typically sent in response to a received LINK_INFO.REQ message. This LINK_INFO.RSP message typically contains the QOS requirement and channel characteristic information of the link(s) that is typically owned by the sender STA. In some embodiments, the LINK_INFO.RSP message format is similar to the exemplary LINK_INFO.IND message (see Tables VII and VIII above).

The new CCO may also appoint a new backup CCO (step 816) and then performs normal CCO operations, i.e., performs the CCO role (step 820).

Figure 9:
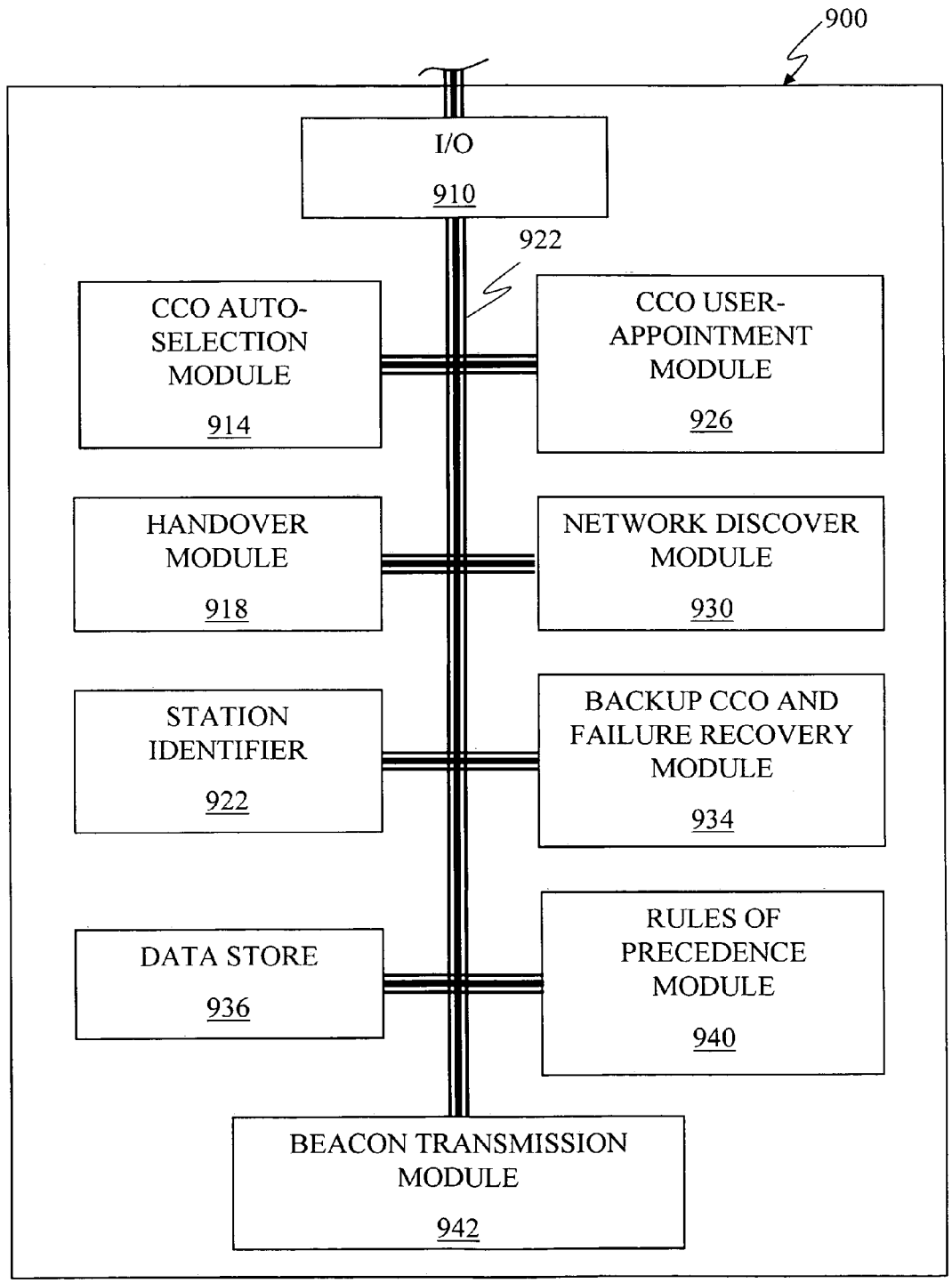
FIG. 9 is a high-level functional block diagram of an exemplary station adapted to function as a CCO, according to an embodiment of the invention.

FIG. 9 is a functional block diagram of an exemplary STA 900 that is adapted to function as a CCO, according to some embodiments of the invention. In alternative embodiments, functions of the exemplary blocks may be distributed between two or more blocks and/or combined with other blocks while remaining within the scope of the invention. In some embodiments, an I/O interface 910 couples the STA 900 to the CN 100, enabling communication with other devices in the network. In some embodiments, a CCO also includes a CCO auto-selection module 914, a CCO handover module 918, a station identifier module 922, a CCO user-appointment module 926, a network discover module 930, a backup CCO and failure recovery module 934, a rules of precedence module 940, and a beacon transmission module 942. Other modules may also be incorporated into this exemplary STA 900, for example, an association and authentication module, which enables the STA 900 to receive association and authentication requests, and accordingly associate and/or authenticate requesting STAs, and a beacon decoding module, which enables a STA to decode beacons and accordingly understand and comply with the BW allocation and scheduling information contained in the beacon.

The CCO auto-selection module 914 performs the CCO auto-selection process described herein. In some embodiments, this auto-selection module 914 interfaces with the rules of precedence module 940 so as to determine a STA in the CN that may function in the role of the CCO or backup CCO, according to some embodiments of the invention. The CCO handover module 918 typically performs the handover process described herein, including sending and receiving appropriate handover messages, and transferring network-management information to a selected station. The station identifier 922, in some embodiments, is a data store, which may include memory, volatile and/or non-volatile, which contains information identifying the STA to the CN. In some embodiments, this station identifier 922 is a MAC address burned into a network interface card. The CCO user-appointment module 926 performs and handles the user interface and interaction, as well as the CCO user-appointment logic described herein. In some embodiments, the CCO-user appointment module interfaces with the handover module 918, i.e., have the user-appointed STA assume the role of the CCO. The network discover module 930 performs the network discover features, described herein, including updating that STA's 900 own discovered station list and discovered network list. In some embodiments, if the STA is functioning as the CCO, the network discover module 930 may include creating and/or updating the network's topology table. The backup CCO and failure recovery module 934 typically handles and performs the failure recovery operations performed by a backup CCO when it performs or assumes the role of the CCO. The rules of precedence module 940 performs the logic operations and processing, such that STA's within the CN are ranked and compared to the current CCO or backup CCO to determine the most or more suitable station to function as the CCO and/or backup CCO. In some embodiments, the different modules may communicate and interface with each other via a bus, dedicated signal paths or one or more channels 922. In some embodiments, the STA 900 may include a data store 936, for example, to store program instructions or data accessed by, read by, and/or written to by the STA 900. The beacon transmission module 942 is adapted to schedule network allocation and resources, by transmitting beacons periodically.

One of ordinary skill in the art will appreciate that the components or various modules of the exemplary STA 900, as described above, may be varied and still be in accordance with the embodiments of the invention. For example, the various modules may be further subdivided into more granular modules as well as have all the modules be integrated into just one or multiple modules, and the functions of some modules may also be carried out by other modules. The components or modules may be implemented in hardware, software, or both, e.g., firmware.

In other embodiments not shown, not all stations operably connected within the CN are adapted to function as a CCO, i.e., these stations do not have the capabilities to perform as a CCO. In these exemplary embodiments, the features described herein may be modified so as to handle situations, wherein there are non-CCO capable stations. For example, the process or operations may be modified such that non-CCO capable stations are not appointed.

Embodiments of the present invention may be used in conjunction with networks that comply with standards or other power line communication standards. Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

We claim:

1. A method of network management in a centralized network comprising a first central coordinator (CCO) and a station adapted to transmit beacons comprising network scheduling and resource allocation, the method comprising the steps of:

indicating to the centralized network that a CCO handover is in progress;

transmitting, by the first CCO to the station, a list of stations associated with the centralized network;

receiving, by the first CCO from the station, a message in response to the transmitted list of stations;

initiating a handover countdown timer; and if the handover countdown timer expires, transmitting, by the station, beacons within the centralized network.

2. The method of claim 1, further comprising the step of transmitting, by the first CCO to the station, link information associated with one or more links in the centralized network.

3. The method of claim 2, wherein the link information comprises Quality of Service requirement and channel characteristic associated with each of the one or more links.

4. The method of claim 1, wherein the step of indicating that the CCO handover is in progress is by setting a flag.

5. The method of claim 1, wherein the station is a user-appointed station.

6. A method of improving network management in a centralized network comprising a first central coordinator (CCO), a first backup CCO, and at least one station, the method comprising the steps of:
   detecting, by the first backup CCO, first CCO beacons from the first CCO; and
   if the first CCO beacons are not detected within a defined period,
      transmitting, by the first backup CCO, first backup beacons comprising network scheduling and allocation information, wherein at least one of the first backup beacons is transmitted using a beacon slot previously allocated to the first CCO;
      requesting topology information from the at least one station in the centralized network, wherein the topology information comprises at least one of the following: information related to stations discovered by the at least one station and information related to centralized networks discovered by the at least one station; and
      selecting a second backup CCO to replace the first backup CCO;
   wherein the step of selecting the second backup CCO is based on a set of rules of precedence;
   wherein the set of rules of precedence is based on at least one of the following criteria:
      whether a CCO is user-appointed;
      CCO-capability classification of a CCO;
      a count of discovered stations associated with a CCO; and
      a count of discovered networks associated with a CCO;
   wherein
      the criterion of whether the CCO is user-appointed is ranked higher than the CCO-capability classification of the CCO;
      the CCO-capability classification of the CCO is ranked higher than the count of discovered stations associated with the CCO; and
      the count of discovered stations associated with the CCO is ranked higher than the count of discovered networks associated with the CCO;
   wherein a greater count value of the count of discovered stations associated with the CCO is ranked higher than a lower count value of the count of discovered stations associated with the CCO; and
   wherein a greater count value of the count of discovered networks associated with the CCO is ranked higher than a lower count value of the count of discovered networks associated with the CCO.

7. A method of improving network management in a centralized network comprising a first central coordinator (CCO), a first backup CCO, and at least one station, the method comprising the steps of:
   detecting, by the first backup CCO, first CCO beacons from the first CCO; and
   if the first CCO beacons are not detected within a defined period,
      transmitting, by the first backup CCO, first backup beacons comprising network scheduling and allocation information, wherein at least one of the first backup beacons is transmitted using a beacon slot previously allocated to the first CCO;
      requesting topology information from the at least one station in the centralized network, wherein the topology information comprises at least one of the following: information related to stations discovered by the at least one station and information related to centralized networks discovered by the at least one station; and
      selecting a second backup CCO to replace the first backup CCO;
   wherein if the first CCO beacons are not detected within a defined period, requesting at least one active link information associated with the at least one station, wherein the at least one active link information comprises quality of service requirement and channel characteristic information.

8. A method of improving network management in a centralized network comprising a first central coordinator (CCO), a first backup CCO, and at least one station, the method comprising the steps of:
   detecting, by the first backup CCO, first CCO beacons from the first CCO; and
   if the first CCO beacons are not detected within a defined period,
      transmitting, by the first backup CCO, first backup beacons comprising network scheduling and allocation information, wherein at least one of the first backup beacons is transmitted using a beacon slot previously allocated to the first CCO;
      requesting topology information from the at least one station in the centralized network, wherein the topology information comprises at least one of the following: information related to stations discovered by the at least one station and information related to centralized networks discovered by the at least one station; and
      selecting a second backup CCO to replace the first backup CCO;
   wherein if the first CCO beacons are not detected within a defined period, transmitting a timing offset between the first CCO and the first backup CCO.

9. A method of improving network management in a centralized network comprising a first central coordinator (CCO), a first backup CCO, and at least one station, the method comprising the steps of:
   detecting, by the first backup CCO, first CCO beacons from the first CCO; and
   if the first CCO beacons are not detected within a defined period,
      transmitting, by the first backup CCO, first backup beacons comprising network scheduling and allocation information, wherein at least one of the first backup beacons is transmitted using a beacon slot previously allocated to the first CCO;
      requesting topology information from the at least one station in the centralized network, wherein the topology information comprises at least one of the following: information related to stations discovered by the at least one station and information related to centralized networks discovered by the at least one station; and
      selecting a second backup CCO to replace the first backup CCO;
   wherein if the first CCO beacons are not detected within a defined period, determining by the at least one station a timing offset between the first CCO and the first backup CCO based on time stamp values associated with first CCO beacons and first backup beacons associated with the first backup CCO.

10. A method of selecting a new central coordinator (CCO) within a centralized network comprising a current CCO and at least one station, the method comprising the steps of:
determining one or more stations from the at least one station that are ranked higher than the current CCO based on a topology table associated with the current CCO and a set of rules of precedence, wherein the topology table comprises a list of discovered stations and a list of discovered centralized networks; and
selecting a new CCO with a highest ranking from the determined one or more stations, wherein the selecting step is based on at least one of the following:
if there is only one station from the determined one or more stations with the highest ranking, selecting the only one station to be the new CCO; and
if there are two or more stations from the determined one or more stations with the highest ranking, selecting one of the two or more stations with the highest ranking to be the new CCO.

11. The method of claim 10, wherein the step of selecting the new CCO if there are two or more stations from the determined one or more stations is based on a random selection.

12. The method of claim 10, wherein the set of rules of precedence is based on at least one of the following criteria:
whether a CCO is user-appointed;
CCO-capability classification of a CCO;
a count of discovered stations associated with a CCO; and
a count of discovered networks associated with a CCO.

13. The method of claim 12,
wherein
the criterion of whether the CCO is user-appointed is ranked higher than the CCO-capability classification of the CCO;
the CCO-capability classification of the CCO is ranked higher than the count of discovered stations associated with the CCO; and
the count of discovered stations associated with the CCO is ranked higher than the count of discovered networks associated with the CCO;
wherein a greater count value of the count of discovered stations associated with the CCO is ranked higher than a lower count value of the count of discovered stations associated with the CCO; and
wherein a greater count value of the count of discovered networks associated with the CCO is ranked higher than a lower count value of the count of discovered networks associated with the CCO.

14. A device adapted to be coupled to a centralized network, the device comprising:
a central coordinator (CCO) auto-selection module adapted to:
determine one or more stations associated with the centralized network, wherein the one or more stations are ranked higher than a current CCO; and
select a new CCO with a highest ranking from the determined one or more stations, wherein the selecting step is based on at least one of the following:
if there is only one station from the determined one or more stations with the highest ranking, selecting the only one station to be the new CCO; and
if there are two or more stations from the determined one or more stations with the highest ranking, selecting one of the two or more stations with the highest ranking to be the new CCO; and
a rules of precedence module adapted to:
rank one or more stations associated with the centralized network, based on a topology table associated with the centralized network and a set of rules of precedence, wherein the topology table comprises a list of discovered stations;
wherein the set of rules of precedence is based on at least one of the following criteria:
whether a station is user-appointed;
CCO-capability classification of a station;
a count of discovered stations associated with a station; and
a count of discovered networks associated with a station; and
wherein the topology table further comprises a list of discovered centralized networks.

15. A device adapted to be coupled to a centralized network, the device comprising:
a central coordinator (CCO) auto-selection module adapted to:
determine one or more stations associated with the centralized network, wherein the one or more stations are ranked higher than a current CCO; and
select a new CCO with a highest ranking from the determined one or more stations, wherein the selecting step is based on at least one of the following:
if there is only one station from the determined one or more stations with the highest ranking, selecting the only one station to be the new CCO; and
if there are two or more stations from the determined one or more stations with the highest ranking, selecting one of the two or more stations with the highest ranking to be the new CCO; and
a rules of precedence module adapted to:
rank one or more stations associated with the centralized network, based on a topology table associated with the centralized network and a set of rules of precedence, wherein the topology table comprises a list of discovered stations;
wherein the set of rules of precedence is based on at least one of the following criteria:
whether a station is user-appointed;
CCO-capability classification of a station;
a count of discovered stations associated with a station; and
a count of discovered networks associated with a station; and
further comprising:
a central coordinator (CCO) handover module adapted to:
indicate to the centralized network at least one of the following:
that a CCO handover is in progress;
that a CCO handover is not in progress;
transmit a list of stations associated with the centralized network;
transmit information related to one or more links in the centralized network; and
initiate a handover countdown timer.

16. The device of claim 15, wherein
if the handover countdown timer expires, stopping beacon transmission by the device, wherein each beacon comprises network scheduling and allocation information.

17. A device adapted to be coupled to a centralized network, the device comprising:
- a central coordinator (CCO) auto-selection module adapted to:
  - determine one or more stations associated with the centralized network, wherein the one or more stations are ranked higher than a current CCO; and
  - select a new CCO with a highest ranking from the determined one or more stations, wherein the selecting step is based on at least one of the following:
    - if there is only one station from the determined one or more stations with the highest ranking, selecting the only one station to be the new CCO; and
    - if there are two or more stations from the determined one or more stations with the highest ranking, selecting one of the two or more stations with the highest ranking to be the new CCO; and
- a rules of precedence module adapted to:
  - rank one or more stations associated with the centralized network, based on a topology table associated with the centralized network and a set of rules of precedence, wherein the topology table comprises a list of discovered stations;
  - wherein the set of rules of precedence is based on at least one of the following criteria:
    - whether a station is user-appointed;
    - CCO-capability classification of a station;
    - a count of discovered stations associated with a station; and
    - a count of discovered networks associated with a station; and further comprising:
- a CCO user-appointed module adapted to:
  - present a user interface adapted to receive station identification information.

18. A system comprising:
- a central coordinator (CCO) adapted to:
  - transmit beacons, wherein each first beacon comprises network scheduling and allocation information;
  - auto-select a new CCO from at least one station based on ranking information associated with each of the at least one station, wherein the ranking information is determined based on a CCO topology table and a set of rules of precedence;
  - accept station identification of a station to function as a new central coordinator;
- the backup CCO adapted to:
  - detect the first beacons transmitted by the CCO;
  - if the first beacons transmitted by the CCO are not detected within a defined period,
    - transmit second beacons, each second beacon comprising network scheduling and allocation information, wherein at least one of the second beacons is transmitted using a beacon slot previously allocated to the CCO;
    - request topology information, wherein the topology information comprises a list of discovered stations and a list of discovered networks;
    - request link information; and
    - select a new backup CCO; and
- at least one network segment operably connecting the CCO and the backup CCO.

19. A device adapted to be coupled to a centralized network, the device comprising:
- an input and output interface adapted to receive and transmit messages within the centralized network; and
- a backup and failure recovery module adapted to:
  - detect first beacons from a CCO; and
  - if the first beacons are not detected within a defined period,
    - transmit second beacons, each second beacon comprising network scheduling and allocation information, wherein at least one of the second beacons is transmitted using a beacon slot previously allocated to the CCO;
    - request topology information from at least one station associated with the centralized network, wherein the topology information comprises information related to a set of stations discovered by the at least one station and information related to centralized networks discovered by the at least one station;
    - request link information associated with one or more links active within the centralized network; and
    - select a backup CCO, wherein the backup CCO is adapted to perform CCO operations when currently operating beacons from a currently operating CCO are no longer detected by the second backup CCO.

* * * * *